May 10, 1966  J. A. PETRIE  3,250,512
GAS TURBINE ENGINE
Filed Nov. 8, 1963  2 Sheets-Sheet 1
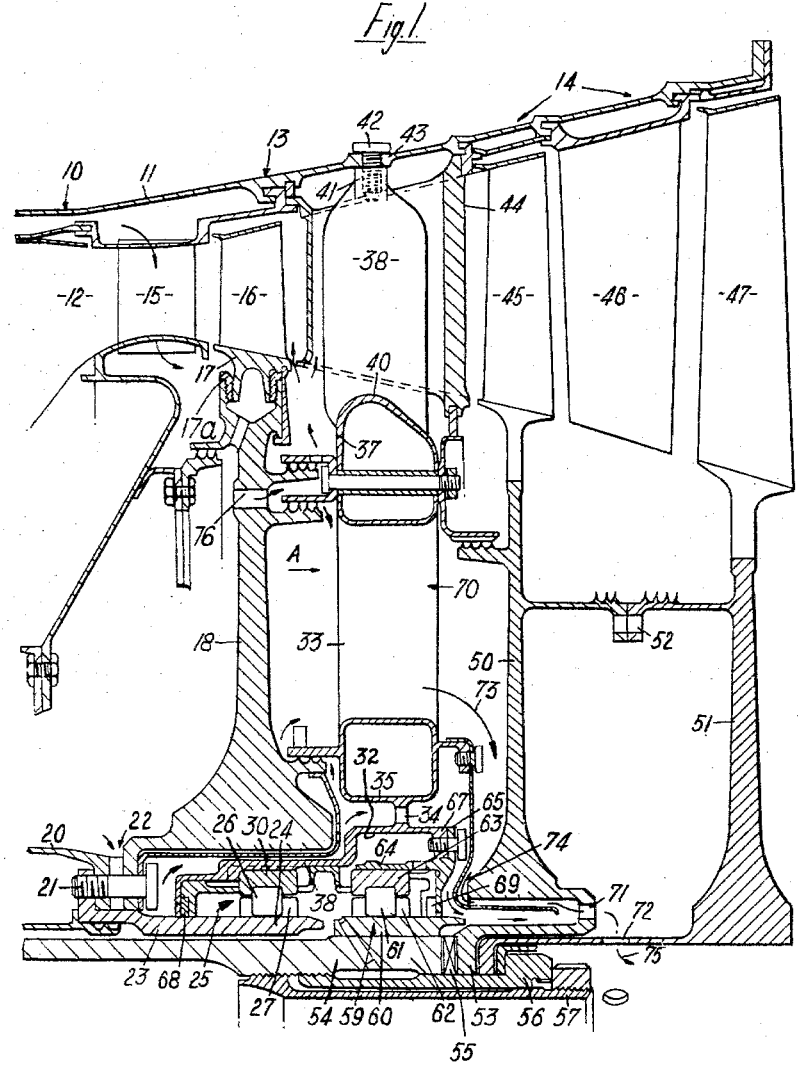
Inventor
JAMES ALEXANDER PETRIE
By
Cushman, Darby & Cushman
Attorneys May 10, 1966 J. A. PETRIE 3,250,512
GAS TURBINE ENGINE
Filed Nov. 8, 1963 2 Sheets-Sheet 2
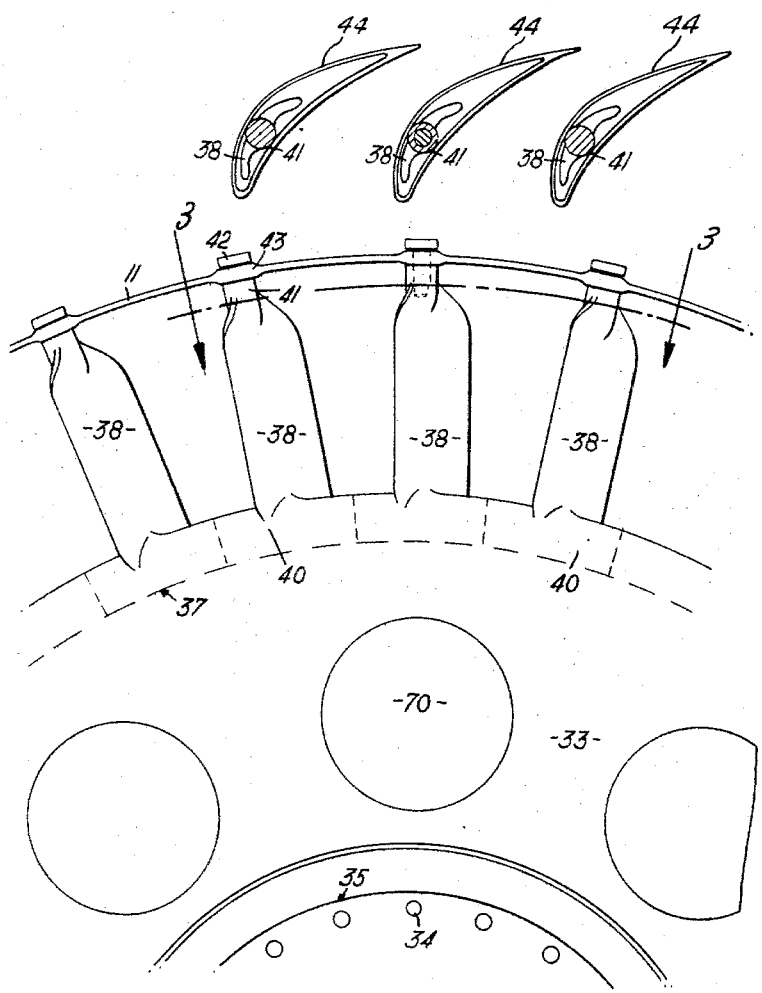
Inventor
JAMES ALEXANDER PETRIE
By Cushman, ————— Cushman
Attorneys United States Patent Office 3,250,512
Patented May 10, 1966

3,250,512
GAS TURBINE ENGINE
James Alexander Petrie, Littleover, Derby, England, assignor to Rolls-Royce Limited, Derby, England, a company of Great Britain
Filed Nov. 8, 1963, Ser. No. 322,397
Claims priority, application Great Britain, Nov. 9, 1962, 42,513/62
7 Claims. (Cl. 253—39)

This invention concerns gas turbine engines of the kind comprising low pressure and high pressure compressors, combustion equipment and high pressure and low pressure turbines, all in flow series, the low pressure compressor and turbine being mounted on one common shaft and the high pressure compressor and turbine being mounted on another common shaft, the two shafts being concentrically mounted one within the other. Such engines will hereinafter be referred to as "gas turbine engines of the kind specified."

According to the present invention there is provided a gas turbine engine of the kind specified, comprising a first bearing situated adjacent and supporting the rotor blades of the high pressure turbine and a second bearing situated adjacent and supporting the rotor blades of the low pressure turbine, said first and second bearings being mounted adjacent one another and being attached to a common stationary structure which is disposed between the low and high pressure turbines and which is fixed to an outer casing of the engine.

Preferably said bearings are attached to the common stationary structure by resilient connections. The resilient connections may be constituted by metal members of "hairpin" section.

In a preferred embodiment, the outer casing of the engine to which the common stationary structure is attached is relatively resilient and can deflect to accommodate relative thermal expansion between the common stationary structure and the outer casing.

The common stationary structure is, preferably, a substantially hollow torus having a relatively resilient wall to which the bearings are attached.

Preferably the substantially hollow torus has a plurality of radially extending angularly spaced apart stiff spokes fixed to its outer surface each of said spokes passing through a nozzle guide vane situated between said high pressure and low pressure turbines. The nozzle guide vanes may be welded to the hollow torus.

The concentrically mounted shafts of the engine are preferably contra-rotating.

The invention is illustrated, merely by way of example, in the accompanying drawings, in which:

FIGURE 1 is a part sectional elevation of part of a gas turbine engine according to the present invention, FIGURE 2 is a view of part of the engine shown in FIGURE 1 taken in the direction of the arrow A of that figure, the nozzle guide vanes being omitted for the purpose of clarity, and FIGURE 3 is a fragmentary sectional view taken substantially on the line 3—3 of FIGURE 2 but with the guide vanes being added thereto.

Referring to the drawings, a gas turbine engine 10 comprises an outer casing 11 within which is mounted combustion equipment 12, a single stage high pressure turbine 13 and a two stage low pressure turbine 14.

The high pressure turbine 13 comprises a set of angularly spaced apart fixed nozzle guide vanes 15 and a set of angularly spaced apart rotor blades 16. The rotor blades 16 are provided with externally threaded base portions 17 which are screwed into bushes 17a. The bushes 17a are screwed into internally threaded apertures formed in a turbine disc 18.

The turbine disc 18 is secured to a hollow shaft 20 by a series of angularly spaced apart set screws 21 and a coupling 22. Also attached to the hollow shaft 20 is a cylindrical part 23, a portion of which constitutes an inner race 24 of a bearing 25. The bearing 25 comprises rollers 26 rolling on the inner race 24 and within a cage 27. Surrounding the rollers 26 is an annular outer race 30 mounted within a flexible member 32. The member 32 is attached to a rigid hollow torus 33 by a web 34 which is fixed to a relatively flexible wall 35 of the torus 33.

The torus 33 has a radially outer wall 37 to which are welded a number (thirty, for example) of radially extending angularly spaced apart stiff spokes 38. These spokes may be forged or cast from nickel based alloys (e.g. those sold under the registered trademark "Nimonic") and each embodies an arcuate segment 40 which forms part of an outer rim to the torus 33.

Each spoke 38 has a boss 41 formed in its radially outer end. Set screws 42, which pass radially through bosses 43 formed in the outer casing 11, engage in tappings in the bosses 41. As will be seen in FIGURE 1, the outer casing 11 is of relatively thin section adjacent the bosses 43, and is relatively resilient in these areas.

Each spoke 38 is mounted within a hollow nozzle guide vane 44. The nozzle guide vanes 44 shield the spokes 38 from the heat of the gases flowing through the turbines.

Downstream of the nozzle guide vanes 44 are rotor blades 45, stator blades 46, and rotor blades 47 of the two stage low pressure turbine 14. The stator blades 46 are attached to the outer casing 11. The rotor blades 45 and 47 are attached to turbine discs 50, 51 respectively which are connected together at 52 by dowels.

The turbine discs 50, 51 are attached at 53 to a hollow shaft 54 by a "Curvic" coupling 55, and are held in place by threaded sleeves 56 and 57 which are concentrically mounted within the hollow shaft 54.

The hollow shaft 54 is concentrically mounted within the hollow shaft 20 and has a sleeve 60 attached to a portion of its outer surface. This sleeve 60 forms the inner race of a roller bearing 59 having rollers 61 rolling within a cage 62 and contacting an outer race 63.

The outer race 63 is fitted into a cylindrical housing 64 which is bolted by means of a flange 65 to one end 67 of the flexible member 32. The end 67 together with the cylindrical housing 64 forms a flexible connecting member of "hairpin" or reversely curved section between the outer race 63 and the rigid torus 33.

The bearings 25, 59 are located in a housing formed by the flexible member 32 and the housing 64, the housing being sealed by ring seals 68, 69.

In operation, the hollow shafts 20, 54, rotate in opposite directions, running in their bearings 25 and 59 respectively. These bearings are connected to the fixed rigid structure formed by the torus 33 by way of resilient connections, the latter being constituted by the flexible member 32 and the cylindrical housing 64 with end portion 67, respectively.

It will be appreciated that any expansion of the torus 33 will not be transmitted to the bearings but will be isolated, by the said resilient connections.

Any expansion which does reach the web 34 will be reduced by the relatively flexible wall 35.

Being situated between the high pressure and low pressure turbines, the stationary structure formed by the torus 33 will become very hot, despite cooling air flows indicated by arrows in FIGURE 1. Relative thermal expansion will, consequently, take place, and the spokes 38 will tend to move radially outwardly. As stated above, the outer casing 11 adjacent the bosses 43 is relatively thin, and is flexible. Thus, any relative movement between the spokes 38 and casing 11 will be accommodated by the casing 11 stretching elastically.

It will be appreciated that compressive forces will be set up in the spokes 38 due to their expansion. To reduce the level of this compressive force during working, a residual tensile force may be introduced into the spokes 38 by pre-stressing the casing 11 or by arranging that a substantial gas pressure acts outwardly on the inner surface of the casing 11.

By positioning the single stationary structure for both turbine bearings between the turbines themselves, the shafts are supported close to the discs. If the span of the shafts can be kept relatively short, this would permit the omission of "intermediate bearings" situated between the outlet from the high pressure compressor and the turbine bearings, i.e. in the zone of the engine occupied by the combustion equipment. By dispensing with these intermediate bearings, a great saving in weight and overall engine length is achieved, since all the associated air feeds, oil feeds, seals and supporting structure are no longer required.

With the particular embodiment disclosed in the drawings, a further advantage can be obtained. It is usual to employ a high pressure seal at the outlet end of the high pressure compressor to reduce the total axial gas thrust on the compressor, by venting the space inside the seal to a value which is balanced by the turbine. With the present arrangement, this high pressure seal might be omitted in some cases.

To balance the axial thrust on the compressor, the axial thrust provided by the high pressure turbine can be increased by venting the back of the turbine disc 18 to the exhaust duct. In the embodiment shown in FIGURE 1, this is done by providing apertures 70 in the torus 33 and apertures 71, 72 in the turbine discs 50, 51. The air then flows from the space downstream of the turbine disc 18 along the path indicated by arrows 73, 74, 75.

High pressure air is fed to the nozzle guide vanes 44 and to the space downstream of turbine disc 18 through apertures 76 in the turbine disc 18.

It will therefore be seen that by providing a gas turbine engine with the bearing structure as described above, various advantageous modifications can probably be effected to the other engine bearings and seals to provide a much simpler, lighter and less costly engine.

Although the casing 11 has been described as an "outer casing" this term is used merely to imply that it is external of the combustion equipment and turbines. In fact this casing 11, could be surrounded by a by-pass passage and thus by a further and truly "external casing." The expression "outer casing" where used in this specification must therefore be taken as meaning external of the combustion equipment and turbines.

I claim:

1. A gas turbine engine comprising an outer casing, a high pressure turbine, nozzle guide vanes, and a low pressure turbine arranged in flow series within the outer casing, a first bearing situated adjacent and supporting the high pressure turbine, a second bearing situated adjacent and supporting the low pressure turbine, a common stationary structure disposed between the low and high pressure turbines and fixed directly to the outer casing, said first and second bearings being mounted adjacent one another and being attached to said common stationary structure, the common stationary structure extending through the nozzle guide vanes and being protected by the latter from the hot turbine gases.

2. A gas turbine engine comprising an outer casing, a high pressure turbine, nozzle guide vanes, and a low pressure turbine arranged in flow series within the outer casing, a first bearing situated adjacent and supporting the high pressure turbine, a second bearing situated adjacent and supporting the low pressure turbine, common stationary structure disposed between the low and high pressure turbines and fixed directly to the outer casing, and resilient connections connecting said first and second bearings to said common stationary structure, the common stationary structure extending through the nozzle guide vanes and being protected by the latter from the hot turbine gases.

3. A gas turbine engine comprising an outer casing, a high pressure turbine, nozzle guide vanes, and a low pressure turbine arranged in flow series within the outer casing, a first bearing situated adjacent and supporting the high pressure turbine, a second bearing situated adjacent and supporting the low pressure turbine, common stationary structure disposed between the low and high pressure turbines and fixed directly to the outer casing, and reversely curved metal members connecting said first and second bearings to said common stationary structure, the common stationary structure extending through the nozzle guide vanes and being protected by the latter from the hot turbine gases.

4. A gas turbine engine comprising an outer casing, a high pressure turbine, nozzle guide vanes and a low pressure turbine arranged in flow series within the outer casing, a first bearing situated adjacent and supporting the high pressure turbine, a second bearing situated adjacent and supporting the low pressure turbine, and common stationary structure disposed between the low and high pressure utrbines and fixed directly to the outer casing, said first and second bearings being mounted adjacent one another and being attached to said common stationary structure, the outer casing being relatively resilient and deflecting to accommodate relative thermal expansion between the common stationary structure and the outer casing, and the common stationary structure extending through the nozzle guide vanes and being protected by the latter from the hot turbine gases.

5. A gas turbine engine comprising an outer casing, a high pressure turbine, a set of nozzle guide vanes, and a low pressure turbine, all arranged in flow series within the outer casing, a first bearing situated adjacent and supporting the high pressure turbine, a second bearing situated adjacent and supporting the low pressure turbine, a substantially hollow torus disposed between the low and high pressure turbines, and a plurality of radially extending angularly spaced apart stiff spokes fixed directly to the outer surface of said torus and to said outer casing, each of the spokes passing through one of said nozzle guide vanes, and being protected by the latter from the hot turbine gases, said first and second bearings being mounted adjacent one another and being attached to said substantially hollow torus.

6. A gas turbine engine as claimed in claim 5 wherein the nozzle guide vanes are welded to the substantially hollow torus.

7. A gas turbine engine comprising an outer casing, a high pressure turbine, a set of nozzle guide vanes and a low pressure turbine, all arranged in flow series within the outer casing, a first bearing situated adjacent and supporting the high pressure turbine, a second bearing situated adjacent and supporting the low pressure turbine, a substantially hollow torus having a relatively resilient wall, said torus being disposed between the low and high pressure turbines, a plurality of radially extending angular spaced apart stiff spokes fixed to the outer surface of said torus and to said outer casing, each of the spokes passing through one of said nozzle guide vanes and being protected by the latter from the hot turbine gases, and reversely curved metal members connecting said first and second bearings to the relatively resilient wall of said torus.

References Cited by the Examiner

UNITED STATES PATENTS 2,711,074 6/1955 Howard _____ 60—39.37

FOREIGN PATENTS 773,499 4/1957 Great Britain.
790,830 2/1958 Great Britain.

JULIUS E. WEST, *Primary Examiner.*